United States Patent
Gopal et al.

(10) Patent No.: US 8,738,584 B2
(45) Date of Patent: May 27, 2014

(54) CONTEXT-AWARE MANAGEMENT OF SHARED COMPOSITE DATA

(75) Inventors: Burra Gopal, Redmond, WA (US); Manish Soni, Hyderbad (IN); Jagdish Singh, Hyderbad (IN); Sander M. Viegers, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 576 days.

(21) Appl. No.: 12/372,631

(22) Filed: Feb. 17, 2009

(65) Prior Publication Data
US 2010/0211545 A1    Aug. 19, 2010

(51) Int. Cl.
*G06F 17/30* (2006.01)

(52) U.S. Cl.
USPC ............ 707/662; 707/620; 707/624; 707/665

(58) Field of Classification Search
None
See application file for complete search history.

(56) References Cited

U.S. PATENT DOCUMENTS

| | | | |
|---|---|---|---|
| 6,326,962 B1 | 12/2001 | Szabo | 715/762 |
| 6,341,291 B1 | 1/2002 | Bentley et al. | |
| 6,774,913 B1 | 8/2004 | Varga et al. | 345/629 |
| 7,130,467 B1 | 10/2006 | Bronder et al. | 382/218 |
| 7,139,675 B2 | 11/2006 | Banks et al. | 702/181 |
| 7,143,079 B2 | 11/2006 | Pauly et al. | 707/1 |
| 7,373,473 B2 | 5/2008 | Bukowski et al. | 711/170 |
| 7,398,283 B2 | 7/2008 | Margolus et al. | 707/200 |
| 2002/0194196 A1 | 12/2002 | Weinberg et al. | 707/104.1 |
| 2003/0218634 A1 | 11/2003 | Kuchinsky et al. | 715/764 |
| 2004/0019614 A1* | 1/2004 | Wang | 707/202 |
| 2004/0119759 A1 | 6/2004 | Barros | 345/853 |
| 2004/0159783 A1 | 8/2004 | Gavin et al. | 250/282 |
| 2005/0165735 A1* | 7/2005 | Lin et al. | 707/2 |
| 2005/0177558 A1* | 8/2005 | Dixon et al. | 707/3 |
| 2005/0206644 A1 | 9/2005 | Kincaid | |
| 2005/0223047 A1 | 10/2005 | Shah et al. | 707/201 |
| 2005/0256907 A1* | 11/2005 | Novik et al. | 707/200 |
| 2006/0167858 A1* | 7/2006 | Dennis et al. | 707/3 |
| 2006/0248274 A1* | 11/2006 | Volodarsky et al. | 711/118 |
| 2007/0073773 A1* | 3/2007 | Walker et al. | 707/104.1 |
| 2007/0094220 A1 | 4/2007 | McCaffrey | |
| 2007/0118551 A1 | 5/2007 | Akkiraju et al. | |
| 2007/0156766 A1 | 7/2007 | Hoang et al. | 707/200 |
| 2007/0180075 A1* | 8/2007 | Chasman et al. | 709/223 |
| 2007/0226196 A1 | 9/2007 | Adya et al. | 707/3 |

(Continued)

OTHER PUBLICATIONS

API Finder, "HeatMap API," Jupiter Media Corporation, 2008, http://www.apifinder.com/APIFinder/APIDisplay/29806, 2 pages.

(Continued)

*Primary Examiner* — Mohammad S Rostami
(74) *Attorney, Agent, or Firm* — Steve Crocker; Jim Ross; Micky Minhas

(57) ABSTRACT

Embodiments provide information composition management features and functionality to manage composite information, but are not so limited. In an embodiment, a computing system can include functionality to provide a composition of informational data that can be used to identify and manage aspects of shared and other data that can be associated with distinct information sources. In one embodiment, a computing platform includes a client that can be configured to access and use information of a plurality of independent sources to create a data composition that includes aspects of shared and unshared data portions and manage data changes of the data composition including managing issues associated with one or more of the plurality of independent sources. Other embodiments are described and available.

20 Claims, 7 Drawing Sheets

(56) References Cited

U.S. PATENT DOCUMENTS

| | | | |
|---|---|---|---|
| 2007/0226314 A1 | 9/2007 | Eick et al. | |
| 2007/0250373 A1 | 10/2007 | Ernest et al. | |
| 2007/0299882 A1* | 12/2007 | Padgett et al. | 707/201 |
| 2008/0052307 A1* | 2/2008 | Dunn et al. | 707/101 |
| 2008/0077570 A1 | 3/2008 | Tang et al. | 707/5 |
| 2008/0177760 A1* | 7/2008 | Fein | 707/100 |
| 2008/0180437 A1 | 7/2008 | Clark et al. | |
| 2008/0249742 A1 | 10/2008 | Scott et al. | 702/179 |
| 2008/0301120 A1 | 12/2008 | Zhu et al. | |
| 2009/0003657 A1 | 1/2009 | Deardorff et al. | 382/113 |
| 2009/0096791 A1 | 4/2009 | Abshear et al. | 345/440 |
| 2009/0254572 A1* | 10/2009 | Redlich et al. | 707/10 |
| 2009/0327196 A1* | 12/2009 | Studer et al. | 706/47 |
| 2010/0017733 A1 | 1/2010 | Barros | 715/766 |
| 2010/0030777 A1* | 2/2010 | Panwar et al. | 707/5 |
| 2010/0082705 A1 | 4/2010 | Ramesh et al. | 707/808 |
| 2010/0106724 A1 | 4/2010 | Anderson | 707/737 |
| 2010/0114484 A1 | 5/2010 | Kida et al. | 701/208 |
| 2010/0211741 A1 | 8/2010 | Soni et al. | 711/118 |
| 2010/0250559 A1 | 9/2010 | Glaenzer et al. | 707/49 |

OTHER PUBLICATIONS

Oracle Application Access Controls Governor, "Release Notes," May 2008, http://download.oracle.com/otn_hosted_doc/logicalapps/801RN_AccessGov2.pdf, 8 pages.

U.S. Appl. No. 12/372,502, filed Feb. 17, 2009 entitled "Shared Composite Data Representations and Interfaces".

Zhao, Haixia et al., "Interactive Auditory Data Exploration: A Framework and Evaluation with Geo-referenced Data Sonification," http://hcil.cs.umd.edu/trs/2006-22/2006-22.htm, 21 pages, as well as 2 web pages documenting the publication date of the article as Aug. 2006.

Brown, Gregory J., Digital Archaeological Archive of Chesapeake's Slavery Steering Committee Workshop, "The Importance of Data Structuring for Extracting Relevant Information," Oct. 6, 2000, http://www.daacs.org/research/G.Brown.pdf, 5 pages.

Kernochan, Wayne, Analyst; Infostructure Associates White Paper, "Master Data Integration: A Key Enabler of Master Data Management," Apr. 2006, http://www-935.ibm.com/services/us/cio/leverage/levinfo_wp_ibm_master_data_mgmt_key_enabler.pdf, 13 pages.

Office Action mailed Jun. 14, 2011, in co-pending U.S. Appl. No. 12/372,502.

Office Action mailed Nov. 17, 2011, in co-pending U.S. Appl. No. 12/372,502.

Notice of Allowance mailed Feb. 15, 2013, in co-pending U.S. Appl. No. 12/372,502.

* cited by examiner

CONTEXT-AWARE MANAGEMENT OF SHARED COMPOSITE DATA

RELATED APPLICATIONS

This application is related to U.S. patent application Ser. No. 12/372,502, filed Feb. 17, 2009, and entitled, "SHARED COMPOSITE DATA REPRESENTATIONS AND INTERFACES," which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Computing advances continue to reduce the amount of time and effort that may be required to perform a given task. Software applications, such as word processing applications, spreadsheet applications, presentation applications, line-of-business (LOB) applications, database applications, etc. have become important tools for business and individual users. In some cases, data of one application or system may be relevant to another application or system. For example, certain business data may be relevant in the context of one or more other applications of a suite of applications, data of an installed email application may be used with a web-based email application, and so on. Managing information across disparate sources can be a daunting and time-consuming task when a user has to open and use multiple applications to use shared data which oftentimes include managing any associated data issues of the disparate sources.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide information composition management features and functionality to manage composite information, but are not so limited. In an embodiment, a computing system can include functionality to provide a composition of informational data that can be used to identify and manage aspects of shared and other data that can be associated with distinct information sources. In one embodiment, a computing platform includes a client that can be configured to access and use information of a plurality of independent sources to create a data composition that includes aspects of shared and unshared data portions and manage data changes of the data composition including managing issues associated with one or more of the plurality of independent sources. Other embodiments are described and available.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
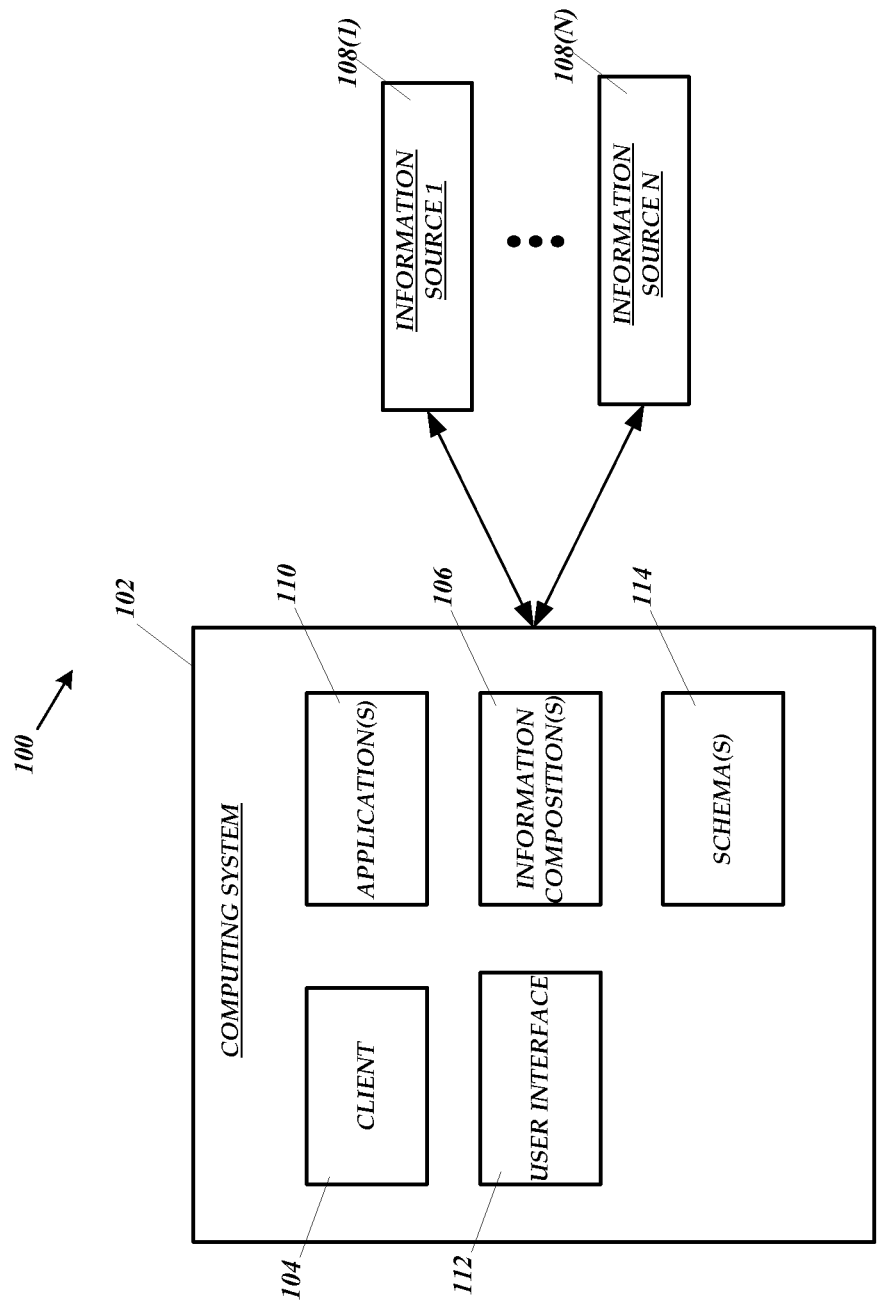
FIG. 1 is a block diagram of an example computing environment having components that can be configured to manage information.

FIG. 1 is a block diagram of an exemplary computing environment 100 having a number of components that can be configured to manage information associated with a number of disparate information sources, but is not so limited. In accordance with various embodiments, a number of components of the computing environment 100 can be configured to provide information composition and management functionality and other features, as described below. For example, one or more components of the environment 100 can be configured with functionality to create and manage aspects of an information composition including identifying shared or corresponding data portions (e.g., object(s), name-value pair(s), etc.) of independent and/or distinct information sources, such as systems, devices, applications, and other data sources for example.

As shown in FIG. 1, the computing system 102 includes a client 104 that can be configured to provide one or more information compositions 106 that include shared and unshared portions of information associated with information sources 108(1) through 108(N). For example, client 104 can be coupled to at least one processor of computing system 102 and, in the context of a suite of applications, configured to access data from a plurality of independent systems having a plurality of distinct and independent data stores to generate a data composition representation.

As described below, according to an embodiment, the client 104 can operate to create and manage one or more data compositions representing aspects of data and/or source interactions and relationships, including managing data flow, real conflicts and potential conflicts, and/or other issues associated with the information sources 108(1) through 108(N) in the context of an information composition. In one embodiment, the client 104 can be used to generate and/or manage a data composition that includes data from a plurality of distinct information sources, including identifying shared data portions and/or unshared data portions associated with each of the plurality of distinct information sources. For example, a particular data composition can include data associated with a first system, device, application, etc., data associated with a second system, device, application, etc., data associated with an Nth system, device, application, and/or shared data used by two or more systems.

As one example, the client 104 can be used to access and use line-of-business (LOB) data along with word processing, spreadsheet, database, personal, and other applications in offline and online modes using a familiar UI and controls to create and manage aspects of a particular data composition, wherein some of the data of the data composition may be shared by a number of applications. For example, the client 104 can generate a data composition representation that includes collaboration data associated with a collaboration system, first business data associated with a first back-end system, second business data associated with a second back-end system, and shared data used by the collaboration system and the second back-end system. Correspondingly, as described below, a particular data composition can include shared data, such as common data used by a plurality of distinct systems, devices, applications, etc. and/or unshared data, such as data used exclusively by a particular system(s), device(s), application(s), etc.

As described below, and in accordance with one embodiment, the client 104 can use one or more schemas having a number of identification properties and values to generate and manage a composition of information or information composition. The generated information composition can be used as part of a conflict determination and information management process, but is not so limited. For example, the client 104 can use one or more application programming interfaces (APIs) and one or more extensible markup language (XML) schemas to generate, manage, and/or present a data composition having shared and unshared data portions, wherein a particular data composition can be stored as one or more data structures as part of local and/or remote memory.

As described below, the client 104 can be configured to generate and manage a data composition included, but not limited to: defining data compositions (e.g., specifies sharing of one or more properties); disassociating aspects of a data composition (e.g., removes sharing of one or more properties); and, reading and/or writing composition information from and to memory, such as client cache or other memory for example. As described below, changes made to overlapping or shared portions of a data composition can be propagated to each source independently without other sources being aware of an overlapping or shared portion. Additionally, the client 104 can operate to detect whether overlapping or shared information of a shared portion of a data composite is different in different sources which can indicate a conflict or conflicts.

With continuing reference to FIG. 1, while one computing system 102 is shown, the computing environment 100 is not so limited and can include any number of computing systems and other components. For example, a number of associated client devices/systems can be included to interact with information sources 108(1) through 108(N). Other applications 110 can also be included with the computing system 102, such as an operating system, a word processing application, an email application, a calendar application, etc. The computing device 102 can also use web-based applications and features to access and manipulate data from one or more of the information sources 108(1) through 108(N).

As an example, a computing system 102, such as a desktop, laptop, handheld, tablet, or other computing device can include a client 104 for use in visualizing and managing composite data, but is not so limited. The client 104 functionality can also be implemented as part of a server system and used to provide information composition and management functionality. In an embodiment, the client 104 can be used to access and use data from a plurality of distinct and independent data sources. For example, the client 104 can be configured to access data from a collaboration system, a private business system, and a business partner system. That is, the client 104 (such as a DUET based client for example) includes functionality to access and use data that would normally require a separate application having tailored functionality to interact with each independent source.

The client 104 can be used in offline (e.g., at a remote location using an unknown network, roaming, disconnected, etc.) and/or online (e.g., corpnet mode, private network, etc.) modes. In an operational mode, the client 104 can use cache memory or some other memory to store information obtained from one or more information sources, including one or more data structures representative of a particular information composition. For example, cache memory can be used when operating in an offline mode.

As described below, the client 104 includes knowledge of the functionality of each information source 108(1)-108(N), which can include the semantics of the data and metadata used by each information source 108(1)-108(N). For example, the client 104 can include a first schema that includes the data properties and values associated with a first information source, a second schema that includes the data properties and values associated with a second information source, and so on, and also including knowledge of the semantic mappings of common data of the information sources 108(1)-108(N).

In one embodiment, the client 104 can include mapping tables to maintain references of related data of each system in conjunction with one or more different systems, wherein the client 104 can use the references to communicate between and manipulate data of the different systems. For example, the client 104 can include a mapping table or tables to map: customer data associated with a LOB system to and from collaboration data of a collaboration server and contact data of a communication server; collaboration data of the collaboration server to and from contact data of the communication server; and, third party web-service data to and from the collaboration data of the collaboration server and the contact data of the communication server.

The client 104 can be configured to use accessed and other data to create one or more information compositions that include shared and unshared information portions, wherein the shared portions can correspond with common data and/or metadata of one or more distinct and independent information sources. For example, assume that the client 104 is currently interacting with and using data associated with five independent systems. For this example, depending in part on the user preference, the client 104 can be configured to create a first data composition that includes shared and unshared data portions associated with the five independent systems, a second data composition that includes shared and unshared data portions associated with the three of the five independent systems, and a third data composition that includes shared and unshared data portions associated with two of the five independent systems.

The client 104 can use various functions to identify, manage, and/or maintain shared and/or unshared information, such as common data for example, associated with the distinct and independent information sources. For example, the client 104 can use one or more APIs to access and use data from various networked systems, wherein the systems are unaware of the other systems on some level. In an embodiment, the client 104 can be configured to provide an information composition based in part on the use of a schema 114 and one or more APIs to identify shared and/or unshared portions of data including changing aspects of the shared and unshared portions of the data.

For example, the client 104 can use one or more APIs to access data from a plurality of independent data sources and use one or more schemas to generate components of a data composition representative of aspects of a particular computing environment including shared data portions, masters of shared data portions, changed or changing portions, and/or conflicting operations or other issues associated with one or more of the identified shared data portions of composite data.

As described further below, and in accordance with an embodiment, a master portion can be defined as the source that controls an informational change, such as a data change associated with a shared data portion for example. As one example, a first system or first master can be associated with and exclusively control a first set of shared data, a second system or second master can be associated with and exclusively control a second set of shared data, and so on. In some cases, multiple masters may be associated with one or more shared information portions. In certain embodiments, master changes to shared information can be provided to other systems, devices, applications, etc., so that the shared information corresponds with the master changes and eliminates the need for user revision.

Figure 6:
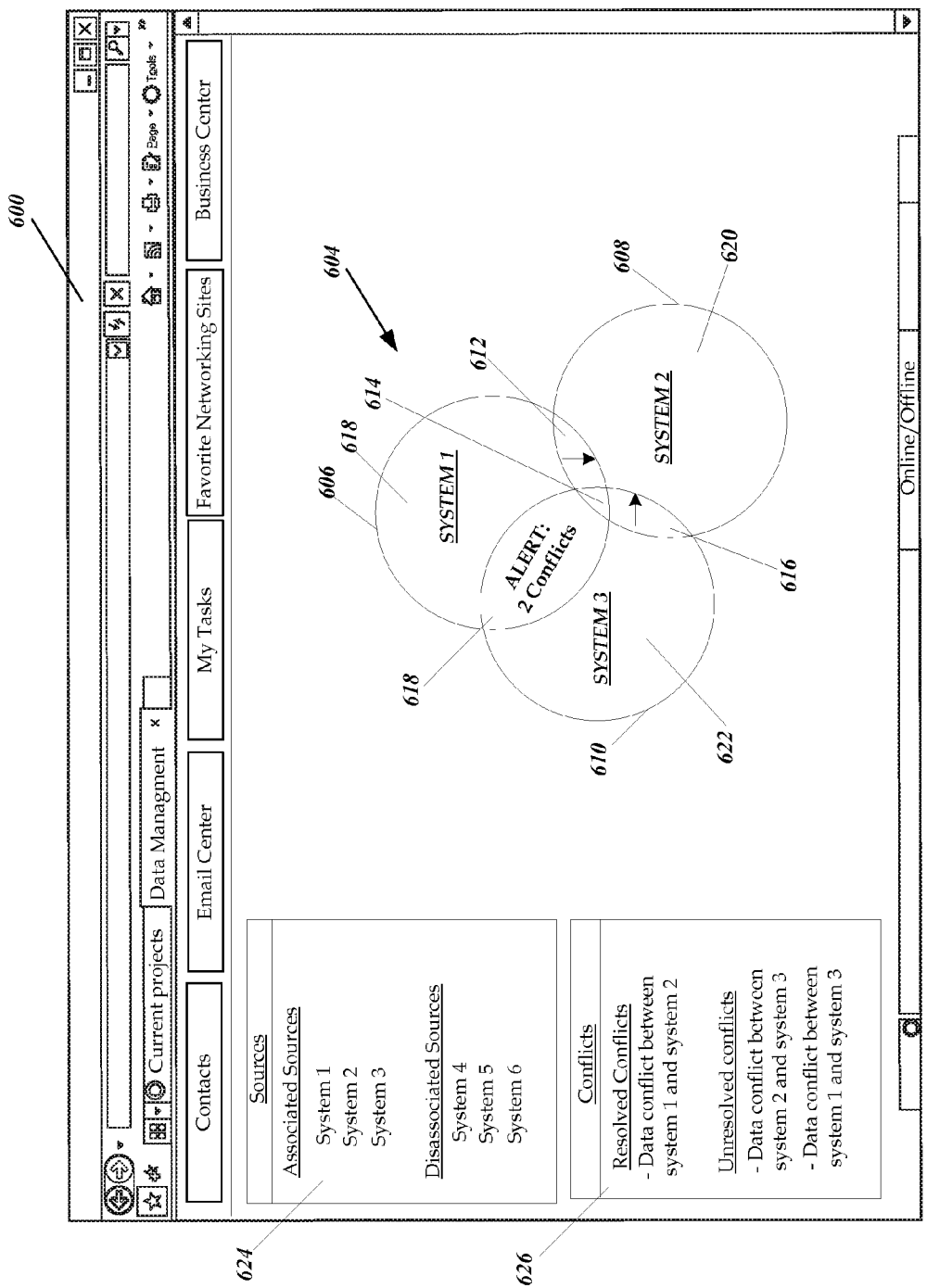
FIG. 6 depicts an exemplary user interface (UI) including a data composition representation.

As shown in FIG. 1, the computing device 102 includes a user interface (UI) 112 that can be used when presenting one or more information compositions to an end-user (see FIG. 6 for example). For example, the client 104 can generate graphical and other data associated with a graphical representation of each data composition which can include identification indicia for each data source, each shared data portion, each unshared data portion, and a direction of change associated with a data change from an associated system or systems.

The UI 112 can be used to present an information composition that includes any identified unshared data portions, shared data portions, changed or changing data of one or more shared portions, directionality of a change; and/or conflicting changes, but is not so limited. For example, a composition diagram (see FIG. 3 for example) can be used to present aspects of a particular data composition, wherein colors, labels, and/or other indicia can be used to enhance a data composition visualization. As described below, such a visualization can include these and additional enhancements to enable a user to quickly identify aspects of a particular data composition.

In one embodiment, a Venn or similar representation can be presented in the UI 112 to represent a data composition that includes: a first color (e.g., blue) to represent unshared data (no overlap) having no conflict and no change; a second color (e.g., green) to represent shared data (some overlap) having no conflict and no change; a third color (e.g., yellow) to represent unshared data (no overlap) having no conflict and a change; a fourth color (e.g., orange) to represent shared data (some overlap) having no conflict and a single master change or a change that can be overridden to define a change direction; and/or a fifth color (e.g., red) to represent shared data having multiple masters and one or more changes or a change that can be overridden to define a change direction. The client 104 or some other component(s) can include functionality to use information of a particular data composition to provide a data composition visualization or presentation.

In one embodiment, the following elements can be used with schema 114 to generate a data composition representation associated with a plurality of independent information sources. The schema can include: a severity of conflict element includes a color (e.g., Color::= "Blue"|"Green"|"Yellow"|"Orange"|"Red"); an overlapping source elements (e.g., OverlappingSources::={Source+}; a not considered source element (e.g., NotConsideredSources::= {Source+}; and, a heat map region element (e.g., HeatMapRegion::={OverlappingSources, NotConsideredSources}). According to such an embodiment, and as described further below, a particular region of a generated data composition representation can include one or more UnmergedPropertyInstance-s, wherein the client 104 can create UnmergedPropertySet-s for any region having an UnmergedPropertyInstance (e.g., UnmergedPropertySet::= {Color, HeatMapRegion, {UnmergedPropertyInstance+}}).

In certain embodiments, and as described further below, master changes to shared information can be provided to other systems, devices, applications, etc., so that the shared information corresponds with the master changes. For example, a data change made by a single master to shared data can be automatically propagated to the other data sources using the shared data and the data associated with the master change. The data change can also be saved in a dedicated store for subsequent access by the other data sources using the shared data. In one embodiment, the client 104 can include data management features that can be used to resolve a data change or changes made by multiple master sources using a defined rule set corresponding to a master or other hierarchy.

In an embodiment, the client 104 can be configured to propagate, administer, and/or force a data change to other sources based in part on a defined master source hierarchy and/or rule set. For example, a defined master hierarchy can include: a first system defined as a master of a first set of shared data (e.g., comprising name-value pairs); a second system defined as a master of a second set of shared data, wherein the first and second sets of shared data may or may not be inclusive; a third system defined as a master of a third set of shared data, wherein the first, second, and third sets of shared data may or may not be inclusive; and so forth. Following this example, changes associated with the first set of shared data are determined by changes made by the first system, changes associated with the second set of shared data are determined by changes made by the second system, and so forth, wherein the client can propagate changes to other systems based in part on an associated master, rule set and/or defined hierarchy.

In one embodiment, the client 104 can be configured to provide a data composition representation that can be used inform a user of a conflict or potential conflict when multiple masters are associated with a data change or changes of a shared data portion, and allow the user to define or select a master or master hierarchy, define or select a rule or rule set, and/or disassociate portions or sources. As part of such an implementation, the user can proactively determine which master controls shared data and/or a master hierarchy associated with each shared portion, including how to propagate or administer a change or change from one master to another master portion, or whether to disassociate one or more sources from a particular composition. For example, a user may prefer to disassociate two or more conflicting systems based in part on a particular data composition in order to preserve data changes made to shared data by the two or more conflicting systems.

In one embodiment, a schema can be used to generate and manage shared data including identifying each source of information, descriptive attributes and/or properties of an associated object in each source and/or shared attributes and/or properties, such as overlapping portions for example between all the sources of information associated with client 104. For example, the client 104 can use such a schema to store a data structure in a cache having a "Customer Contact"

object shared between an EXCHANGE server and a CRM LOB system. For this example, "Customer Credit Rating" and "Social Security Number" are for properties present only in the LOB system and, category, tags and follow-up flags/reminders are for properties present only in the EXCHANGE server. However, for this example, first and last Names, phone numbers and address of a customer are common to the EXCHANGE server and to the LOB system.

For N sources, the schema can be used to define properties and other information shared between each pair of sources, giving a total of NC2=N*(N−1)/2 sets of shared properties, N>=2. In an embodiment, instead of defining all N*(N−1)/2 pairs, the client 104 can use a schema to define one composite object having all pertinent properties (e.g., Customer Contact) including defining mappings to each of the (possibly N) sources of information for the composite object.

In one embodiment, a schema, such as schema 114 for example, can include, but is not limited to: one or more Globally Unique Identifier (GUID) strings that identify one or more of: a property name (e.g., PropertyName::=UniqueID); a type name "integer", "string", etc. (e.g., PropertyType::=String); and, a source of information (e.g., Source::=UniqueID). A property can be defined as a combination of a name and type.

If the Source is Null indicates a property of a composite object that is not specific to a source, wherein such properties can be mapped to an actual source of data to supply obtain real values (e.g., Property::={Source1Null, PropertyName, PropertyType}) and include bi-directional property mappings. Property mapping between three or more sources can be described using multiple pairs having a common Property, as in {{P1, P2}, {P1, P3}} (e.g., PropertyMapping::={Property1, Property2|Null}.

According to such an embodiment, a composite object can include a collection of one or more (+) property mappings (e.g., CompositeObject::={PropertyMapping+}, wherein any set of bytes that are interpreted according to the property-schema (e.g., Value::=byte[]). As one example, a merged property instance (without conflicts) includes a single value in both sources of a PropertyMapping (e.g., MergedPropertyInstance::={PropertyMapping, Value} but can be extended to specify transformation rules 1 and 2 to convert value from a first value to a second value acceptable to each source. An unmerged property mapping has explicit values from each source since each source has modified the property (e.g., UnmergedPropertyInstance::={PropertyMapping, Value1, Value2}).

In one embodiment, a value corresponding to MergedPropertyinstance can be determined using a value associated with an UnmergedPropertyInstance including: requiring that Value1 and Value2 are not null (i.e., implying no changes); if Value1=null, then Source1 has not made changes to the property and Value2 is the value; if Value2=Null, then Source2 has not made changes to the property and Value1 is the value; if Value1=Value2, then any one of these values is the actual value of the Property Mapping; and, if Value1 is not equal to Value2, there is a conflict, and there is no actual value until user intervention or rule application for example. If there is an actual value based on the above rules, a MergedPropertyInstance can be generated to resolve any conflicting and/or unmerged data.

A CompositeObjectInstance can be generated upon resolving all UnmergedPropertyInstances to MergedPropertyInstances. In one embodiment, a composite object instance (without conflicts) is a set of one or more (+) MergedPropertyInstances (e.g., CompositeObjectInstance::={MergedPropertyInstance+}, wherein an UnmergedPropertySet includes a number of unresolved UnmergedPropertyInstance-s (e.g., UnmergedPropertySet::={UnmergedPropertyInstance+}).

In one embodiment, the client 104 can use a schema, such as schema 114 for example, to determine whether a source's change to a shared or corresponding portion can be overridden if the portion is modified or being modified by another defined source of information. For the "Customer Contact" object example above, a change to a "Customer Address" value in EXCHANGE can be overridden if the value is being modified in the LOB system (but NOT if the value is being modified in SHAREPOINT, or some other system for example, a change to a "Customer Address" value in SHAREPOINT can be overridden if being modified in either EXCHANGE or the LOB system, and a change to a "Customer Address" value in a social networking application can be overridden if being modified in any of the other sources (e.g., EXCHANGE, SHAREPOINT, the LOB system, etc.).

Such an overriding process can be expressed as a directed-acyclic-graph of dependencies among certain properties, wherein cyclic dependencies can be considered invalid (e.g., if the LOB system is in the override list for "Customer Address" in EXCHANGE, then EXCHANGE cannot be in the override list for "Customer Address" in the LOB system) and can be extended to cycles with a plurality of independent sources.

In an embodiment, an override list (e.g., SourceOverrideList::={Source*}) can be used to manage and track aspects if an override, including source override interactions for zero or more sources. When the override list is empty or null, a corresponding source of a shared portion is the master source and cannot be overridden. In one embodiment, the Property definition can be defined to include SourceOverrideList as an additional attribute (e.g., Property::={Source|Null, PropertyName, PropertyType, SourceOverrideList|Null}).

A master can correspond to a source that is the real origin of a change and can include any source in the SourceOverrideList or a property's own source. A master can also be defined as an end-user (e.g., Master::=Source//"User" is a special source). The value of a master (e.g., MasterValue::=Value) is the value that has been defined for a shared portion, as part of an override operation, and/or selected by an end-user. The Master and MasterValue can be included in the UnmergedPropertyInstance definition (e.g., UnmergedPropertyInstance::={PropertyMapping, Value1, Value2, Master|Null, MasterValue|Null }).

In one embodiment, the client 104 can use a master determination in quantifying a direction of change and associated propagation as follows: if Master=PropertyMapping.Property1.Source, the direction is from source 1 to source 2; else if Master=PropertyMapping.Property2.Source, the direction is from source 2 to source 1; else if Master="User", then MasterValue is a user-override; else if Master=some other source, then MasterValue is a propagation from that source to both 1 and 2.

In an embodiment, the client 104 can also compute a value for the MergedPropertyInstance from an UnmergedPropertyInstance by: 1) determining if the Master or MasterValue is null, and if null, then compute the real value of the master as described above; 2) determining if Master is in PropertyMapping.Property1.SourceOverrideList, and if so, then MasterValue is acceptable to source 1; 3) determining if Master is in PropertyMapping. Property2. SourceOverrideList, and if so, then MasterValue is acceptable to source 2; and, 4) determining if Master is "User", and if so, then MasterValue is acceptable to sources 1 and 2. The client 104 can use the value(s) to construct a MergedPropertyInstance and thereby resolve any conflicting and/or unmerged data. The CompositeObjectInstance can be defined upon resolving all UnmergedPropertyInstances to MergedPropertyInstances.

Figure 2:
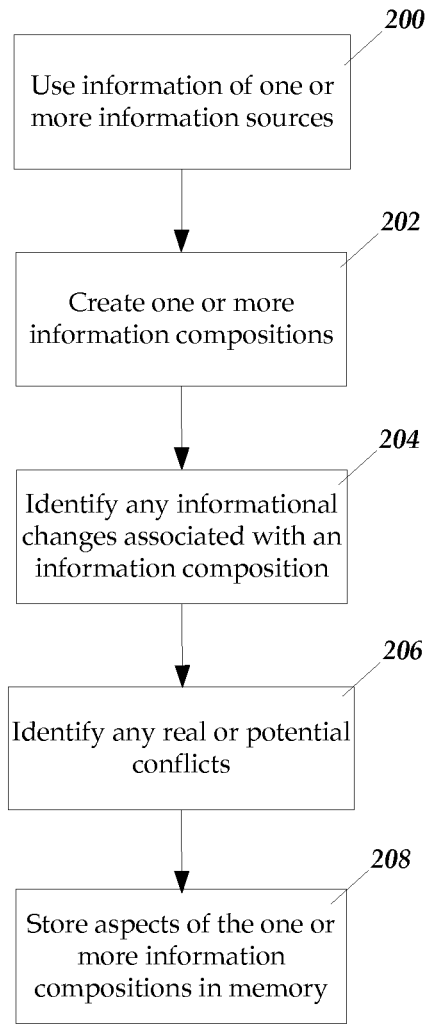
FIG. 2 is a flow diagram illustrating an exemplary process of using a data composition.

FIG. 2 is a flow diagram illustrating an exemplary process of managing information associated with a number of distinct information sources. In one embodiment, a computer-implemented process can be used to generate an information composition that includes identified information changes, identified data overlaps, and/or master portions associated with a number of distinct information sources. For example, as part of generating a data composition, the process can first identify data overlaps by examining mappings between name-value pairs of independent data sources and then identifying whether a master has been defined for each overlap having a data change.

In accordance with one embodiment, the components of FIG. 1 are referred to in the description of FIG. 2, but other component configurations and functionalities are available. Additionally, while a number and order of operations are shown, other embodiments are available. At 200, the client 104 can be configured to use information of one or more of the information sources 108(1)-108(N). For example, the client 104 can be configured to use representative schemas having properties and associated values to generate a data composition that includes relational and other characteristics of a plurality of information sources. In one embodiment, the client 104 can use one or more APIs to access and use data of one or more the information sources 108(1)-108(N).

At 202, the client 104 can operate to create one or more representative information compositions associated with the information sources 108(1)-108(N), including shared and unshared portions of information. For example, the client 104 can operate to generate a data composition based solely on a number of sources currently being used; including maintaining a cache of previously accessed and/or used data associated with systems not currently being used. As another example, the client 104 can access data associated with three distinct end-user applications and create a data composition associated with the three distinct end-user applications, the data composition including unshared data portions that include unshared name-value pairs and shared data portions that include shared name-value pairs of at least two of the distinct end-user applications.

At 204, the client 104 can operate to identify any informational changes associated with a shared portion of information. For example, the client 104 can use an API to detect a data change associated with a distinct source. As another example, an API can be used to alert the client 104 of a data change including the source of the data change. In one embodiment, the client 104 can operate to store an identified data change in a data structure that corresponds to the information source making the change, including storing an identifier or reference to identify other information sources associated with a shared data portion that includes the changed or to be changed data.

At 206, the client 104 can operate to identify any conflicts or potential conflicts associated with an informational change. In one embodiment, the client 104 can use an overlap schema to determine if an information source associated with a shared data portion is a master of that shared data portion. According to such an embodiment, if there are multiple masters associated with a shared portion and making a change, then the client 104 can use master resolution rules, such as a master hierarchy for example, to determine which master of the multiple masters takes precedence over the other masters.

If there are no defined rules, the client 104 can prompt the user to: define master and/or data resolution rules or a rule set; select a rule or rule set from a number of default resolution rule sets based in part on the number and/or type of corresponding masters; and/or select or define a master to be associated with each identified shared portion and/or data item. Master selections may or may not be administered or propagated to other sources and/or users based in part on a particular implementation. As an example, there is no real conflict if only one master is associated with if a shared portion; however, a potential conflict may exist if the user is currently offline and multiple masters are or have been associated with the identified shared portion in the past or if other sources and/or users are allowed to define a master(s) and any associated rule sets.

At 208, the client 104 can store the information composition or particular aspects of the information composition to memory. For example, the client 104 can store changes associated with a particular data composition, such as master rule set definitions, master associations, and/or any changes to values of a shared data structure being used to track changes to data of the data composition, including any real or potential data conflicts. As another example, as part of providing a data composition for storage in memory, the client 104 can identify each data source of a plurality of data sources including identifying shared, corresponding, and/or common data being used by at least two distinct data sources and unshared data corresponding to the plurality of data sources. In one embodiment the client functionality can be included in a server and used to provide one or more information compositions to a requesting system, device, application, etc.

Figure 3:
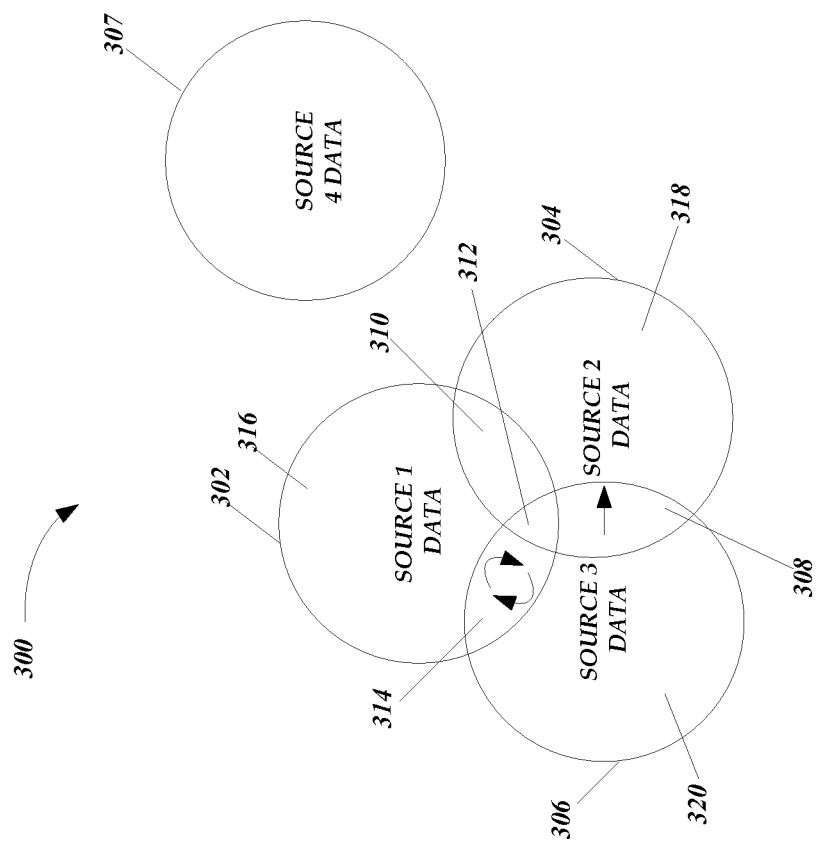
FIG. 3 depicts aspects of an exemplary data composition.

FIG. 3 depicts aspects of an exemplary data composition 300. For example, the client 104 can provide composition data that can be used to graphically present aspects of the data composition 300 to an end-user using UI 112. A data composition, such as data composition 300 for example, can be used to identify aspects of a particular computing environment, including identifying and managing potential or real data conflicts, potential or real data issues, and/or other aspects of a particular computing environment. In one embodiment, the client 104 can be configured to present a data composition visualization for display to an end-user including colors, indicia, and/or other representations to assist in visualizing aspects of the data composition 300 and/or associated sources. Moreover, a data composition visualization presented on a display as part of a UI enables an end-user to quickly identify and manage potential or real conflicts, potential or real issues, and/or other aspects of a data composition and/or computing environment.

As shown in the example of FIG. 3, a client has provided a data composition 300 that includes four data sets (the four large circles) that are associated with four distinct data sources: a first data set 302, a second data set 304, a third data set 306, and a fourth data set 307, but is not so limited. As one example, the first data set 302 may include a LOB system's data; the second data set 304 may include collaboration data associated with a distinct collaboration system; the third data set 306 may include personal data including communication and other data included with emails and content, attachments, appointments, reminders, notes, access properties, etc. associated with a distinct communication system; and, the fourth data set 307 may include some other system's data. While four data sources are shown in the example of FIG. 3, a particular implementation can use data and associations of any number and configuration of data sources.

That is, for this example, the four data sets 302-307 are associated with four distinct types of systems. Various embodiments include any number of data sets and/or systems/devices/applications/etc. According to this example, in the present state(s) of composition, the data sets 302-306 include four shared portions 308, 310, 312, and 314: wherein the shared portion 308 corresponds with data used by the second and third systems; the shared portion 310 corresponds with data used by the first and second systems; the shared portion 312 corresponds with data used by the first, second, and third systems; and, the shared portion 314 corresponds with data used by the first and third systems.

Accordingly, as shown, each non-overlapping data portion is assumed to only be used by the corresponding system and such portions are currently isolated or inaccessible from the other systems. Stated differently, for this example, data portion 316 of data set 302 is inaccessible by the second and third systems, data portion 318 of data set 304 is inaccessible by the first and third systems, and data portion 320 is inaccessible by the first and second systems. The data of the fourth data set 307 is not being shared with any of the other three systems. Generally, composite information associated with shared portions can be calculated according to $(2^N-1)$, wherein N is an integer corresponding to the number of associated data sources. As described below, a client can operate to navigate and manage an exponential number of overlaps and associated items.

In FIG. 3 there are seven (7) portions 308-320 included in the shared data environment corresponding to data sources 302-306. As shown, an associated client has identified a potential conflict or a real conflict (indicated by the opposing arrows of this example) in shared portion 314 of the data composition 300. For example, a manipulation of data associated with system 1 (e.g., LOB system) may be affecting data used by system 3 (e.g., EXCHANGE system), and vice versa, since a master is not defined for the shared portion 314 or system 1 and system 3 are both masters of shared portion 314. Accordingly, arrows or other elements can be used to indicate a direction or directionality of a change. For example, opposing arrows and other indicia can be used to indicate potential conflicts or existing conflicts associated with a shared portion, including multiple changes being made by multiple master systems; and, a single arrow can be used to indicate directionality of change or identify a master-subordinate relationship associated with a shared or corresponding shared portion.

The single arrow shown in the exemplary shared data portion 308 illustrates that the third system (e.g., EXCHANGE system) controls changes to shared data of the shared data portion 308, potentially affecting data associated with the second system (e.g., SHAREPOINT system). Such visual cues provide immediate feedback to a user concerning data changes, data source interactions and relationships, potential conflicts, real conflicts, etc. As further enhancement, in one embodiment, a client can be configured to apply a distinctive color to identify a shared data portion that includes a conflict or other problem. For example, the color red can be used to identify a conflict needing immediate attention.

Figure 4:
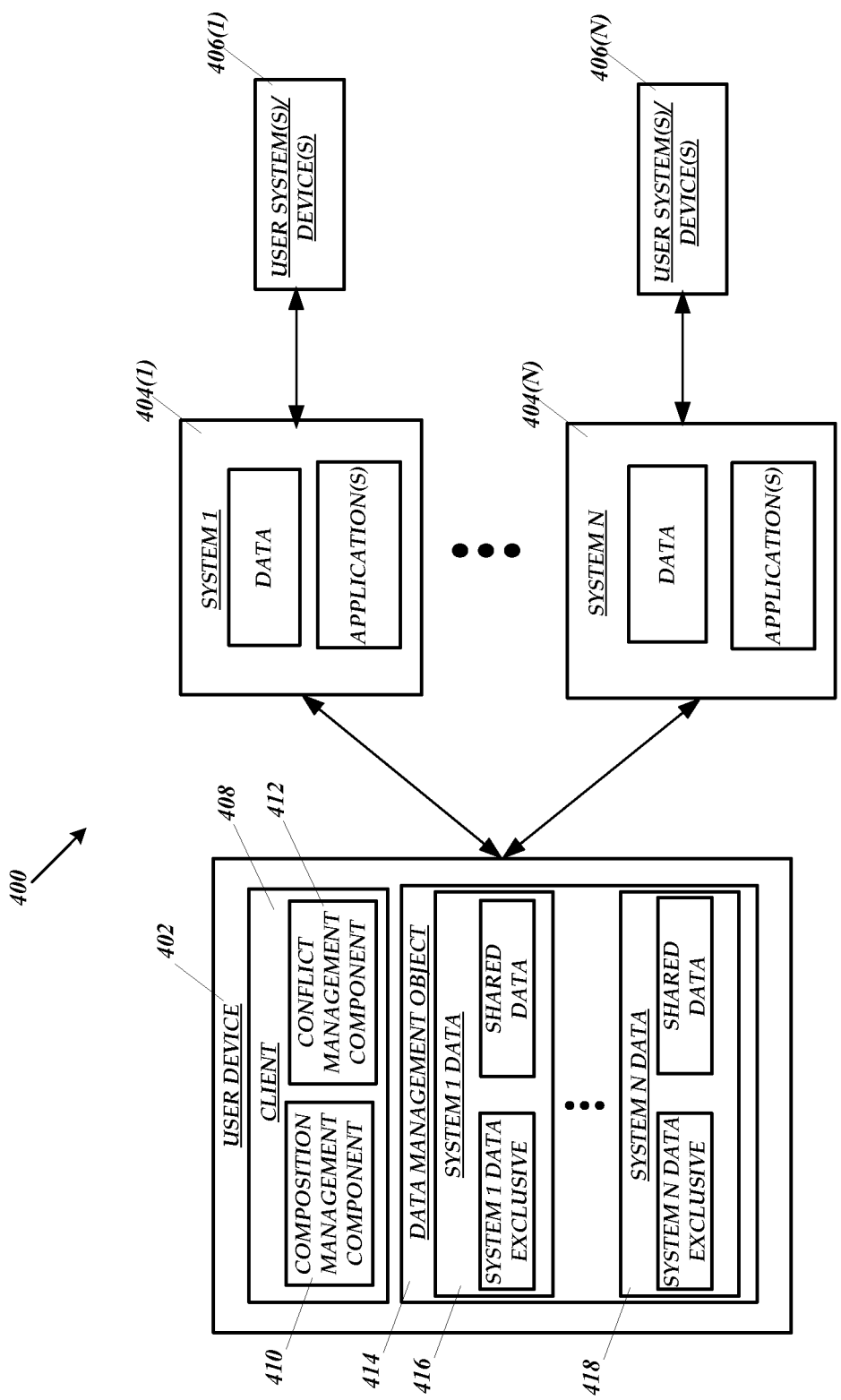
FIG. 4 is a block diagram of an exemplary computing environment.

FIG. 4 is a block diagram of an example computing environment 400 having components that can be configured to provide and use aspects of one or more data compositions to manage aspects of shared and/or unshared data portions and/or associated data sources. As shown in FIG. 4, a user computing device 402 is configured to communicate with distinct systems 404(1) through 404(N), each including data and applications. For example, the computing device 402 can be communicatively coupled to one or more of the distinct systems 404(1)-404(N) and operate in offline and online modes to use and manage data of the one or more distinct systems 404(1)-404(N).

According to the exemplary computing environment 400, distinct system 404(1) is communicatively coupled to one or more user devices/systems 406(1), distinct system 404(N) is communicatively coupled to one or more user devices/systems 406(N), and so on. For this example, since systems 404(1)-404(N) are distinct systems, user devices/systems 406(1)-406(N) are not configured to interact with any of the other systems. For example, system 404(1) may be designated as master of a set of business data and configured to provide certain business processes, wherein user devices/systems 406(1) are only aware and can use data of a first system 404(1), and another system 404(N) may be designated as master of a set of communication data and configured to execute certain communication-related processes, wherein user devices/systems 406(N) are only aware and can use data of system 404(N), etc.

However, as described below, user device 402 includes a client 408 that can be configured to communicate and interact with one or more of the distinct systems 404(1)-404(N), including accessing and using data, including metadata, of one or more of the distinct systems 404(1)-404(N). For example, the client 408 can be included as part of application platform (e.g., DUET) using local and/or remote resources to access and use data of the distinct systems 404(1)-404(N) as part of online and offline operations, wherein the client 408 can maintain a cache that includes system data and other information for use in operating in offline and other modes. As another example, the client 408 can operate to communicate with an OFFICE server or servers (e.g., EXCHANGE server, SHAREPOINT server, etc.) to share information with other clients/users, including using native OFFICE store or stores (e.g., ".OST" files, .PST" files, a word processing files, spreadsheet files, database files, etc.) in addition to communicating with business and other distinct systems.

With continuing reference to FIG. 4, and in accordance with one embodiment, computing device 402, such as a laptop, desktop, handheld device, etc. can include a client 408 having a composition management component 410 and a conflict management component 412, but is not so limited. The composition management component 410 can be configured to provide one or more data compositions associated with a plurality of distinct data sources, such as three or more of the systems 404(1)-404(N) for example, but is not so limited. The conflict management component 412 can be configured to identify and/or resolve data and other real or potential conflicts using aspects of a data composition, but is not so limited.

In one embodiment, the client 408 can use one or more schemas to create a data management object (DMO) 414 that can be used to manage data of one or more of the distinct systems 404(1)-404(N). The following example schema can be used by the client 408 in accordance with an embodiment:

```
<?xml version="1.0" encoding="utf-8"?>
<xs:schema targetNamespace="http://tempuri.org/XMLSchema.xsd"
    elementFormDefault="qualified"
    xmlns="http://tempuri.org/XMLSchema.xsd"
    xmlns:mstns="http://tempuri.org/XMLSchema.xsd"
    xmlns:xs="http://www.w3.org/XMLSchema"
> <xs:element name="Source" type="xs:ID" />
    <xs:element name="SourceOverrideList">
    <xs:complexType>
        <xs:sequence maxOccurs="unbounded" minOccurs="0">
```

```
          <xs:element ref="Source"/>
        </xs:sequence>
      </xs:complexType>
    </xs:element>
    <xs:element name ="Property">
      <xs:complexType>
        <xs:sequence>
          <xs:element name ="Name" type="xs:ID"/>
          <xs:element name ="Type" type="xs:string"/>
          <xs:element ref="Source" minOccurs="0"/>
          <xs:element ref="SourceOverrideList"/>
        </xs:sequence>
      </xs:complexType>
    </xs:element>
    <xs:element name="PropertyMapping">
      <xs:complexType>
        <xs:sequence>
          <!-- This is the first Property 1-->
          <xs:element ref="Property" />
          <!-- This is the second Property2 -->
          <xs:element ref="Property" minOccurs="0" maxOccurs="1"/>
        </xs:sequence>
      </xs:complexType>
    </xs:element>
    <xs:element name="CompositeObject">
      <xs:complexType>
        <xs:sequence>
          <xs:element ref="PropertyMapping" minOccurs="1" maxOccurs="unbounded" />
        </xs:sequence>
      </xs:complexType>
    </xs:element>
    <xs:element name="Value" type="xs:byte" />
    <xs:element name="MergedPropertyInstance">
      <xs:complexType>
        <xs:sequence>
          <xs:element ref="PropertyMapping"/>
          <xs:element ref="Value" />
        </xs:sequence>
      </xs:complexType>
    </xs:element>
    <xs:element name ="UnmergedPropertyInstance">
      <xs:complexType>
        <xs:sequence>
          <xs:element ref="PropertyMapping" />
          <!-- This is the first Value1 -->
          <xs:element ref="Value"/>
          <!-- This is the second Value2 -->
          <xs:element ref="Value"/>
          <!-- This is the Master source, which can also be a special source, "User" -->
          <xs:element ref="Source" minOccurs="0" maxOccurs="1" />
          <!-- This is the MasterValue, which is the final merged/resolved value -->
          <xs:element ref="Value" minOccurs="0" maxOccurs="1" />
        </xs:sequence>
      <xs:complexType>
    </xs:element>
    <xs:element name="Color">
      <xs:simpleType>
        <xs:restriction base="xs:string">
          <xs:enumeration value="Blue"/>
          <xs:enumeration value="Green"/>
          <xs:enumeration value="Yellow"/>
          <xs:enumeration value="Orange"/>
          <xs:enumeration value="Red"/>
        </xs:restriction>
      </xs:simpleType>
    </xs:element>
    <xs:element name="OverlappingSources">
      <xs:complexType>
        <xs:sequence maxOccurs="unbounded" minOccurs="1">
          <xs:element ref="Source"/>
        </xs:sequence>
      </xs:complexType>
    </xs:element>
    <xs:element name="NotConsideredSources">
      <xs:complexType>
        <xs:sequence maxOccurs="unbounded" minOccurs="0">
          <xs:element ref="Source"/>
        </xs:sequence>
      </xs:complexType>
    </xs:element>
    <xs:element name="HeatMapRegion">
      <xs:complexType>
        <xs:sequence>
          <xs:element ref="OverlappingSources"/>
          <xs:element ref="NotConsideredSources"/>
        </xs:sequence>
      </xs:complexType>
    </xs:element>
    <xs:element name="UnmergedPropertySet">
      <xs:complexType>
        <xs:sequence>
          <xs:element ref="Color"/>
          <xs:element ref="HeatMapRegion"/>
          <xs:element ref="UnmergedPropertyInstance" minOccurs="1" maxOccurs="unbounded"/>
        </xs:sequence>
      </xs:complexType>
    </xs:element>
</xs:schema>
``` wherein,
PropertyName::=UniqueID
PropertyType::=String
Source::=UniqueID
SourceOverrideList::={Source*}
Property::={Source1Null, PropertyName, PropertyType, SourceOverrideList Null}
PropertyMapping::={Property1, Property2 Null}
CompositeObject::={PropertyMapping+}
Value::=byte[ ]
MergedPropertyInstance::={PropertyMapping, Value}
Master::=Source//"User" is a special source
MasterValue::=Value
UnmergedPropertyInstance::={PropertyMapping, Value1, Value2, Master Null, MasterValue|Null}

In one embodiment, the client 408 can operate to compute an actual value of a MergedPropertyInstance from an UnmergedPropertyInstance including, but not limited to:

1) If Master is Null or MasterValue is Null, then the real-value can be computed according to:

a) Both Value1 and Value2 cannot be Null, since that would mean that no changes have occurred!

b) If Value1=Null, then Source1 has not made changes to the property and Value2 is the actual value;

c) If Value2=Null, then Source2 has not made changes to the property and Value1 is the actual value;

d) If Value1=Value2, then any one of these values is the actual value of the Property Mapping; and, e) If Value1 is not =Value2, then this is a conflict, and there is no actual value until user intervention or rule application.

2) If Master is in PropertyMapping.Property1.SourceOverrideList, then MasterValue is acceptable to 1.

3) If Master is in PropertyMapping.Property2.SourceOverrideList, then MasterValue is acceptable to 2.

4) If Master is "User", then MasterValue is acceptable to 1 and 2.

If there is an actual value based on the above rules, the client 408 can construct a MergedPropertyInstance and thereby resolve a conflict and/or unmerged data. Upon resolving all UnmergedPropertyInstances to MergedPropertyInstances, the client 408 can construct a CompositeObjectInstance, as shown in the example below.

CompositeObjectInstance::={MergedPropertyInstance+}
Color::="Blue"|"Green"|"Yellow"|"Orange"|"Red"

OverlappingSources::={Source+}
NotConsideredSources::={Source+}
HeatMapRegion::={OverlappingSources, NotConsideredSources}

For this example, a data composition can include one or more regions having one or more UnmergedPropertyInstance-s. In one embodiment, the client 408 can create an UnmergedPropertySet-s by: UnmergedPropertySet::={Color, HeatMapRegion, {UnmergedPropertyInstance+}}

With continuing reference to FIG. 4, the DMO 414, including its constituent parts, can be created and stored as a data structure in memory. Additionally, a data master can be defined using a schema which can also be used to define data and metadata associated with each system. In one embodiment, a schema can be used to define overlapping or shared data portions of a computing environment, including each controlling system or master. For example, a schema can be defined such that an EXCHANGE system is always the data master of a certain shared or corresponding name-value pair(s). Thus, in such an example, the EXCHANGE system controls data operations which override other system operations, such as operation made by a LOB system, SHAREPOINT system, and/or some other system for certain name-value-pairs.

Aspects of a DMO 414 can be used by the client 408 and/or other component as part of data management operations and functionality, as described below. The composition management component 410 can use aspects of a DMO 414 to create a data composition including identifying unshared and shared data portions. The conflict management component 412 can also use aspects of a DMO 414 to manage and/or track real and/or potential conflicts associated with unshared and/or shared data portions of a particular data composition. In one exemplary embodiment, components of the system the system 400 can include one or more application program interfaces (APIs) that can be used to access and use data associated with distinct data sources, including creating and managing a data composition and associated representation, as described below.

In one embodiment, the composition management component 410 can operate to generate a data composition based in part on aspects of a DMO 414 that includes a number of unshared data portions and a number of shared data portions, and wherein the shared data portions correspond to shared, corresponding, and/or common data used by two or more independent sources that may or may not be configured to interact with one another. A data composition can be stored as structured data in a local memory location, such as a client cache for example, remote memory location, or some combination of memory locations or areas. The composition management component 410 can create a data composition representation that can be stored in memory based in part on aspects of DMO 414 that includes representative data corresponding to multiple shared and unshared data portions having including corresponding data properties, values, and/or associated mappings or bindings. Correspondingly, the composition management component 410 can use DMO 414 to identify, track, and/or manipulate data associated with a plurality of distinct data sources.

As shown in FIG. 4, the DMO 414 includes a first data structure 416 corresponding to data associated with system 404(1), a second data structure 418 corresponding to data associated with system 404(N), etc. which has been accessed and/or used by the client 408 and/or user device 402. In an embodiment, the client 408 can use one or more schemas to generate aspects of the DMO 414 including data structures corresponding to unshared data portions and shared data portions associated with a plurality of distinct systems. For the example of FIG. 4, each of the data structures of the DMO 414 can include data exclusive to a corresponding system and shared data. For example, the composition management component 410 can operate to identify and store a temporary copy of data used solely by each system in cache along with shared data associated with each system and other systems.

In one embodiment, the client 408 can be configured to use mapping or binding features to identify and/or track name-value pairs that are associated with a shared data portion of a data composition, wherein the shared data portion corresponds to data used by two or more of the distinct systems. For example, each data structure of the DMO 414 can include structural data tables having name-value pairs representing shared and unshared data portions including a master identification corresponding to a controlling data source of each shared portion, such as tables for shared and unshared EXCHANGE data for example, tables for shared and unshared line of business (LOB) system data, etc. and shared data tables including master identification data, if known, assigned, or selected, for each shared portion of a data composition. Following such an example, each table can include shared data that can include a subset of the unshared data and/or mappings to a table or tables of a corresponding system or systems (e.g., shared data may correspond to contact data of a business associate that is also used for personal communications, such as email addresses, contact numbers, etc.).

Data that may not be included in a shared data table may include certain data (and metadata) that does not make sense, is inappropriate, and/or incompatible with a particular system/device/application/etc. For example, certain private data may not be included in the shared data depending on the particular implementation. However, the shared data can include data that can be used once a particular system/device/application/etc. is upgraded or modified to include functionality to use and interpret some previously inaccessible portion of shared data. In the example of FIG. 4, shared data is shown to be included in each data structure corresponding to a distinct system; however, the shared data can be maintained as a separate structure or included in one of the data sets and referred to using references or links to access and use the shared data and to define relationships between the shared data and one or more systems/devices/applications/etc.

As described briefly above, the conflict management component 412 can be configured to use aspects of a data composition and/or information provided by the composition management component 410 to identify real or potential conflicts or other issues associated with two or more distinct data sources. For example, the conflict management component 412 can be configured to use aspects of a data composition to recognize when multiple or conflicting data values are associated with a shared data portion. In one embodiment, the client 408 can be configured to provide an alert or other indication when the conflict management component 412 identifies a real conflict or potential conflict, which may include restricting further data operations until the real conflict or potential conflict is resolved. For example, as part of a data composition representation, the client 408 can assign a color (e.g., red), an animation (e.g., GIF), and/or a textual conflict indicator (e.g., ALERT) to a shared portion determined to have a real conflict by the conflict management component 412.

In one embodiment, the conflict management component 412 can apply a number of conflict management rules to resolve a data conflict including resolving a master of a shared data portion that is associated with an underlying conflict, but is not so limited. For example, the conflict management component 412 can use a rule set that includes rules for resolving conflicts of a shared data portion having a plurality of associated data masters and associated changes to one or more name-value pairs. The conflict management component 412 can also be configured to disassociate two or more data sources based in part on user input which includes unbinding one or more objects and/or removing a mapping between corresponding objects of two or more distinct data sources. Accordingly, the conflict management component 412 can operate to disassociate objects of a shared portion of a data composition. For example, the conflict management component 412 can use one or more APIs to disassociate data sources or portions thereof from one another.

In one embodiment, a disassociation operation can operate to remove or ignore object bindings and/or mappings of any associated shared portions from a particular data composition. For example, a user may opt to select one data source as a master of changes for certain shared data portions, wherein the conflict management component, based in part on the selection, can operate to remove or ignore one or more mappings between corresponding or mapped portions of a shared data portion. As an example, the conflict management component 412 can remove a mapping that binds the same data value associated with the "Last Name" property of a contacts repository of a communication system to the "L_name" property in a data store associated with a LOB the system.

As one result, once two or more sources have been disassociated from one another, changes made to data of each source may not be flagged as a real or potential conflict. In one embodiment, the client 408 can present a data composition which includes a disassociated source by separating the disassociated source from a data composition representation (see FIG. 3). Thereafter, a user can refer to such a data composition representation to readily identify updated unshared portions and/or shared portions of a particular data composition.

Figure 5:
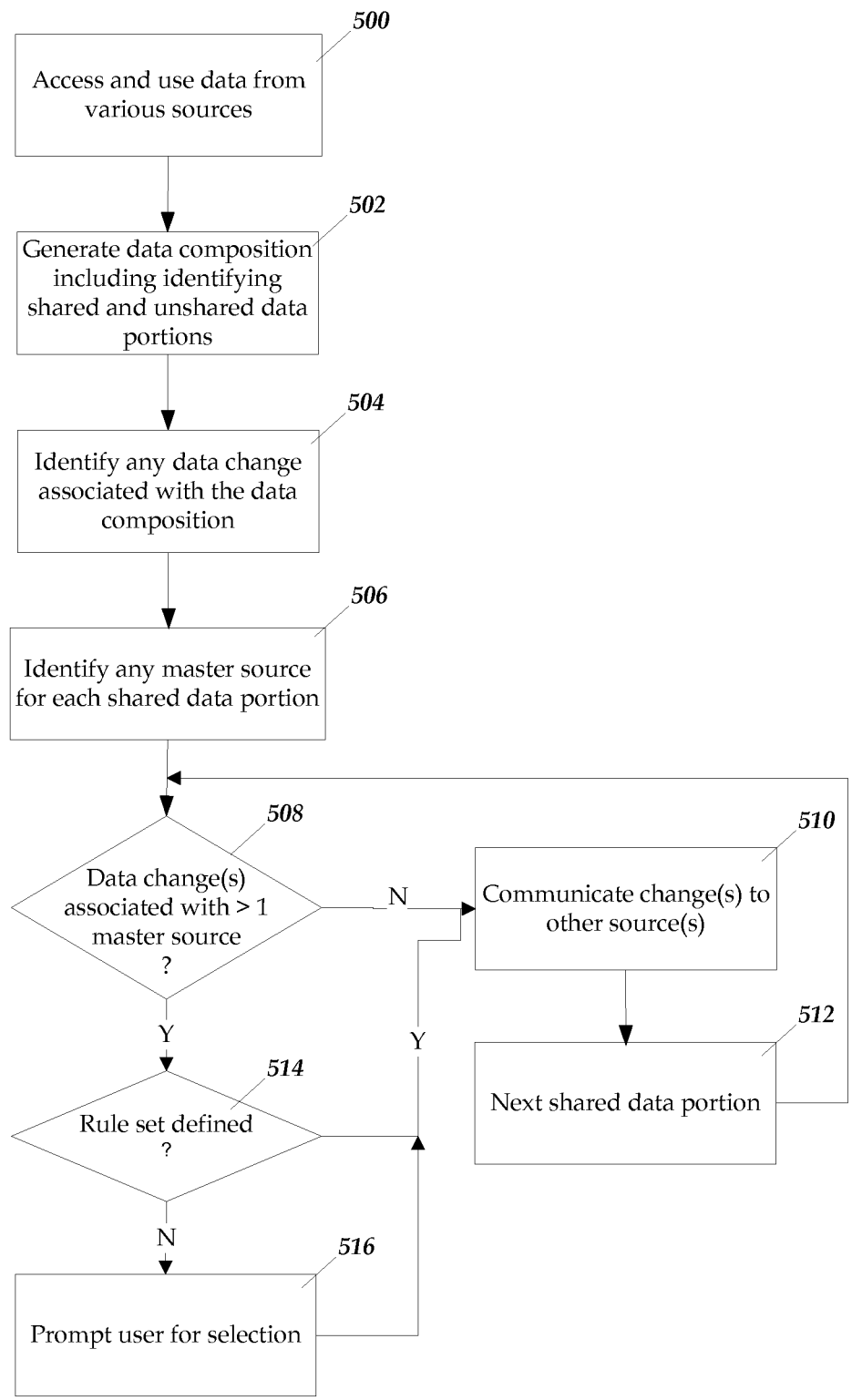
FIG. 5 is a flow diagram illustrating an exemplary process of managing data associated with a number of distinct systems.

FIG. 5 is a flow diagram illustrating an exemplary process of managing data associated with a number of distinct systems, including using aspects of a data composition representation to identify data changes and/or overlaps associated with a plurality of distinct systems. In accordance with one embodiment, the components of FIG. 4 are referred to in the description of FIG. 5, but other component configurations and functionalities are available. Additionally, while a number and order of operations are shown, other embodiments are available.

At 500, the client 408 can be configured to access and use data of one or more of the distinct system 404(1)-404(N). For example, the client 408 can be integrated as part of an application platform (e.g., DUET) and used to access and manipulate data of distinct and independent systems. At 502, the composition management component 410 can use the accessed data to generate one or more data compositions, including identifying unshared and shared portions of the data. For example, the composition management component 410 can use one or more APIs to create as many temporary copies of the DMO 414 in a cache as there are data sources.

At 504, the composition management component 410 can operate to identify any data changes associated with a shared data portion, including copying a data source's specific change into an associated copy in the cache. For example, the composition management component 410 can detect data changes by comparing shared source tables to identify mismatched values of a shared name-value pair or receiving a communication that a data source wishes to change data of a shared data portion. As another example, the composition management component 410 can refer to overlap definitions of an associated schema to identify and create all physical data-source overlaps for a particular data change, including marking the actual data change(s) corresponding to each overlap and including information of a source or sources associated with the data change.

At 506, the composition management component 410 can operate to identify a master portion to be associated with any identified shared data portions. For example, the composition management component 410 can refer to a user-defined master rule set to identify a master system for use in managing data operations, including data changes, of any identified shared portions. As another example, the client 408 can use metadata to identify a master source associated with a changed or changing name-value pair.

At 508, the composition management component 410 can operate to determine whether multiple masters are associated with a data change of a shared data portion. For example, the composition management component 410 use an API and/or schema to evaluate each data change of a shared data portion and determine if more than one master source is associated with a particular change, such as a change to a value of first name-value pair of a first system, wherein the first name-value pair corresponds to a second name-value pair of a second system and may or may not have an identical name.

In one embodiment, at 508, the client 408 can use an API to detect and/or access a data change and the composition management component 410 can use one or more schemas to identify shared data portions or overlaps of a data composition, including identifying a master or masters of each shared data portion. At 510, the composition management component 410 can propagate and/or administer a data change to one or more other data sources associated with the shared data portion having a data change, and the flow proceeds to 512 wherein the client 408 can assess the next shared portion. For example, at 510, the composition management component 410 can operate to communicate a data change corresponding to one master source's change to other data sources associated with each shared data portion having a change. That is, for this example, one master source controls the communication of data changes to other data sources that are associated with each shared portion of a data composition.

If more than one master source is associated with each shared portion at 508, the flow proceeds to 514, and the conflict management component 412 can operate to determine if a master rule set or other rules are to be associated with the shared portion having the data change. For example, a master rule set can include rules defining which master source is to control a shared or corresponding portion based in part on the data item being considered. In one embodiment, the conflict management component 412 can use a rule set defining a hierarchy of master sources to use in conjunction with a give name-value pair when communicating data changes and/or identifying real or potential conflicts of a shared data portion of a particular data composition. As one example, one rule set may define that a certain master source is to control data changes when the master source is identified as being associated with a shared portion having a data change and also when one or more other defined sources are identified as being associated with the shared data portion. If a rule set is defined, the flow proceeds to 510 and on to 512 as discussed above, but the flow is not so limited.

If a rule set or other rules are not defined, and according to one embodiment, the flow proceeds to 516 and the client 408 can prompt the user to select or define a master, select or define a master rule set, or perform some other operation(s) since multiple masters have been identified as being associated with a shared data portion having a data change. For example, the user may choose to define a rule set for a shared portion that requires a first system as the data master during a first time period, a second system as the data master during a second time period, and a third system as the data master during a third time period. As an example, the client 408 can operate to prompt a user to resolve a conflict including selecting a master when providing a data composition visualization. Continuing with this example, as part of the prompting, the client 408 can provide a representative composition that depicts shared data portions as being overlapping and includes a distinctive color (e.g., red) to fill in a shared data portion to delineate that the shared data portion has a data change and is associated with a plurality of master sources.

In one embodiment, the client 408 can use an API to allow a user to select which master-portion change to propagate to all other overlapping portions. The flow proceeds to 510 upon a user selection. Alternatively, rather than prompting the user for a selection, the client 408 can operate to automatically select a master for each shared portion having a change based in part on an amount of data included in each shared portion (e.g., a size of a shared portion) and the type of masters, a master of an adjacently shared portion or portions, and/or some other criteria. While a number and order of operations are shown, other embodiments are available.

FIG. 6 depicts an exemplary user interface (UI) 600 of a computing device having a client that can be used to provide aspects of a data composition. As shown in FIG. 6, the UI 600 includes a data composition presentation space 602. For this example, the client has operated to generate a data composition representation 604 being displayed in the data composition presentation space 602. In an embodiment example, the client can use aspects of a DMO stored as a data structure in memory to provide a data composition representation.

Data composition representation 604 can be used to identify aspects of a user computing environment including, but not limited to: data movement and/or controlling sources, identification of potential and/or real data conflicts, identification of potential or real data issues, and/or identification of other issues and aspects of a particular data composition and associated computing environment. For example, data composition representation 604 can be used to quickly identify data changes of shared data portions, controlling or master sources associated with a data change, and/or real or potential conflicts associated with an identified data change.

As shown in UI 600, data composition representation 604 includes three data sets that are associated with three distinct data systems: a first data set 606, a second data set 608, and a third data set 610. For example, at some point, the user may have accessed data: from a LOB system that is included in the first data set 606; from a collaboration system that is included in the second data set 608; and, from a web-based application that is included in the third data set 610. While three data sets are shown in the example of FIG. 6, a particular implementation can include any number and configuration of data. For this example, the three data sets 606-610 are known to be associated with three independent systems.

According to this example, the data composition representation 604 includes four shared portions 612, 614, 616, and 618. As shown, the shared portion 612 corresponds with data used by both of the first and second systems; the shared portion 614 corresponds with data used by the first, second, and third systems; the shared portion 616 corresponds with data used by both of the second and third systems; and, the shared portion 618 corresponds with data used by both of the first and third systems. In one embodiment, the amount of overlap or size of a shared data portion can be sized or configured to illustrate an amount of data included in a shared portion (e.g., more overlap corresponds with greater amounts of shared data).

For this example, each non-overlapping data portion is assumed to only be used by the corresponding system and isolated from the other systems. That is, data portion 618 of data set 606 is not used by the second and third systems, data portion 620 of data set 608 is not used by the first and third systems, and data portion 622 of data set 610 is not used by the first and second systems. In one embodiment, colors, animations, and/or other visualizations can be used to distinguish compositional aspects of certain portions from other portions of the data composition representation 604. As one example, the shared data portion 618 associated with system 1 and system 3 is shown visually as being larger than the shared data portion 612 associated with system 1 and system 2, illustrating that shared data portion 618 includes relatively more data as compared with the shared data portion 612.

In certain UI implementations, color and other enhancements can be used to present aspects of a particular data composition. For example, the data composition representation 604 of FIG. 6 can be graphically enhanced to enable an end-user to quickly and efficiently identify data changes including real and/or potential conflicts associated with shared portions of a particular data composition.

Continuing with this example, the unshared data portion 620 can be filled in with the color blue to represent unshared data having no conflict and no change; the unshared portions 618 and 622 can be filled in with the color yellow to represent unshared data having no conflict and at least one change; the shared portions 612 and 614 can be filled in with the color green to represent shared data having no conflict and no change; shared portion 616 can be filled in with the color orange to represent shared data having no conflict and a single master change; and, the shared data portion 618 can be filled in with the color red to represent a conflict since multiple masters are associated with at least one data change of shared data portion 618.

If the user chooses to disassociate a system or a portion of data or if a rule or rule set resolves a conflict, the data composition representation can be presented to reflect such a change (e.g., change color red to orange or some other color, change color orange to yellow or some other color, etc.) providing additional compositional feedback to the user. For this example, the user can feel confident of the integrity of an associated computing environment and data interrelationships when the various portions are colored green and/or blue.

As depicted in FIG. 6, an associated client has identified a conflict and provided an "ALERT" indication along with the number of conflicts. The client has also included directionality indicators (e.g., arrows) in shared data portion 612 and shared data portion 616 to indicate that the first system controls any data change associated with the shared portion 612 and the third system controls any data change associated with the shared data portion 616, including communicating any such changes to the second system.

Correspondingly, aspects of a data composition representation can be used to provide immediate feedback to a user concerning data changes, system interactions, potential conflicts, real conflicts, and/or other issues. The exemplary UI 600 also includes a space 624 for displaying association and disassociated information for various sources, such as a number of associated systems and disassociated systems for example, and a space 626 for displaying conflict-related information for various sources, such as a number of resolved conflicts and a number of unresolved conflicts for example.

In one embodiment, a client can be configured to drill-down into any set of property mappings among multiple sources represented in the data composition representation and show the conflicting changes and overlaps at each individual property mapping level. For example, assume that three properties (A, B and C) are being mapped between three sources. Further assume that A, B, and C are being (or have been) modified by two sources X and Y simultaneously. In such a scenario, an overlapping region of a data composition representation can be colored with red to identify a conflict associated with the shared data portion or overlapping region.

However, according to such an embodiment, the user can click on an overlapping region and the client can operate to present additional information regarding the particular issues and/or conflicts associated with the particular overlapping region and/or associated sources. Continuing with this example, the user may click on the overlapping region that has been colored red to determine that the property A is being (or has been) modified by X, property B is being (or has been) modified by Y, and property C is being (or has been) modified by source X and source Y.

When presenting the additional information, the client can operate to show property A and property B in orange (shared data, no conflict, single master) having arrows from source X to source Y, and arrows from source Y to source X, respectively, and property C can be presented in red to show a conflict. Accordingly, users can analyze any UnmergedPropertyInstances and convert select ones to MergedPropertyInstances in resolving conflicts. As one result, the client can generate and manage a CompositeObjectInstance be resolving any UnmergedPropertySet-s and UnmergedPropertyInstance-s, but is not so limited.

In various embodiments, other information can be provided in the UI 600 including: presenting an overall list of conflicting or out of date items along with a resolution status; presenting relevant information about a conflicting item to assist a user selection; providing a rule creation area to enable users to create composition and/or conflict rules, such as providing a base rule set for handling multiple masters, different types and/or amounts of changes, and/or other issues; and/or, ensuring that a conflict management operation and/or data composition operation respects policies and business rules in effect in for each component or system of a particular computing environment.

The UI 600 of an embodiment can include further interactive features such as: including the number of data changes next to an arrow or in a shared portion; hovering capability to provide a number of changes as a tool-tip that can pop up; clicking on any portion can pop up a list of properties and/or values that have changed in a particular portion; clicking on a conflict can show the conflicting values from each source; and/or allowing users to select which data change to preserve by selecting the master of the particular change. Using such a UI 600 of FIG. 6 enables a user to manage composite data to reduce or eliminate unintentional data loss, corruption, duplication, and/or violation of rules of an underlying system.

For example, the UI 600 can include a data composition representation that shows a conflicting item and assists the user in making a decision to resolve the conflict in the context of the business data or business process. Additionally, UI 600 can be used instead of using multiple and different UIs and associated tools that may be disassociated and/or isolated from certain data, an object or objects, a system or systems, a process or processes, etc. to manage composite data and/or components of a computing environment. While a configuration is shown for the exemplary UI of FIG. 6, other configurations and embodiments are available.

As described above, in various embodiments, a client of the above-described computing environments and other environments can be configured to, but is not limited to: determine a master of a shared or overlapping portion of a data composition representation; determine if a data change or changes associated with a shared or overlapping portion can be overridden if one information source is modified by specific other source(s) of information; add and/or remove master sources of property mappings, and/or add and/or remove the sources of an override list corresponding to a property mapping of an associated source; detect and/or identify real and/or potential conflicts whenever a property mapping is changed simultaneously in multiple sources so that the property change either: (i) has multiple master sources, or (ii) has a source that is not included in an override list; propagate changes to sources associated with a property mapping or mapping if there are no conflicts or upon resolution; provide a conflict resolution, given: (i) a property mapping (or a set of property mappings) of a number of information sources, and (ii) a simultaneous or near simultaneous modification associated with the conflict and/or property mapping(s); present a data composition that depicts conflicts of a composite object for any set of property mappings of that object, including overlaps corresponding to various property mappings and/or conflicting changes and/or the direction of changes; present conflicting changes and overlaps at each individual property mapping level; and/or, updating a data composition representation upon resolving any conflicts to indicate such resolution.

The computing environments and/or embodiments described herein can be configured to include networking, security, and/or other communication functionality to provide an interactive environment for associated users. Accordingly, the environments and components include functionality to communicate with other computing devices, communication devices, and/or other systems and are not intended to be limited to the embodiments and examples described herein. Moreover, components can be configured to communicate via a wired, wireless, and/or combination of various communication networks.

The computing environments and systems described herein can be configured as a networked environment that includes software, firmware, hardware, and other components to provide a distributed computing environment, such as a .NET or other framework for example. Additionally, while a certain number and configuration of components are described and shown, other numbers of components and configurations can be used. For example, a computing environment can include a plurality of computing devices, clients, servers, repositories, and/or other components.

Exemplary Operating Environment

Figure 7:
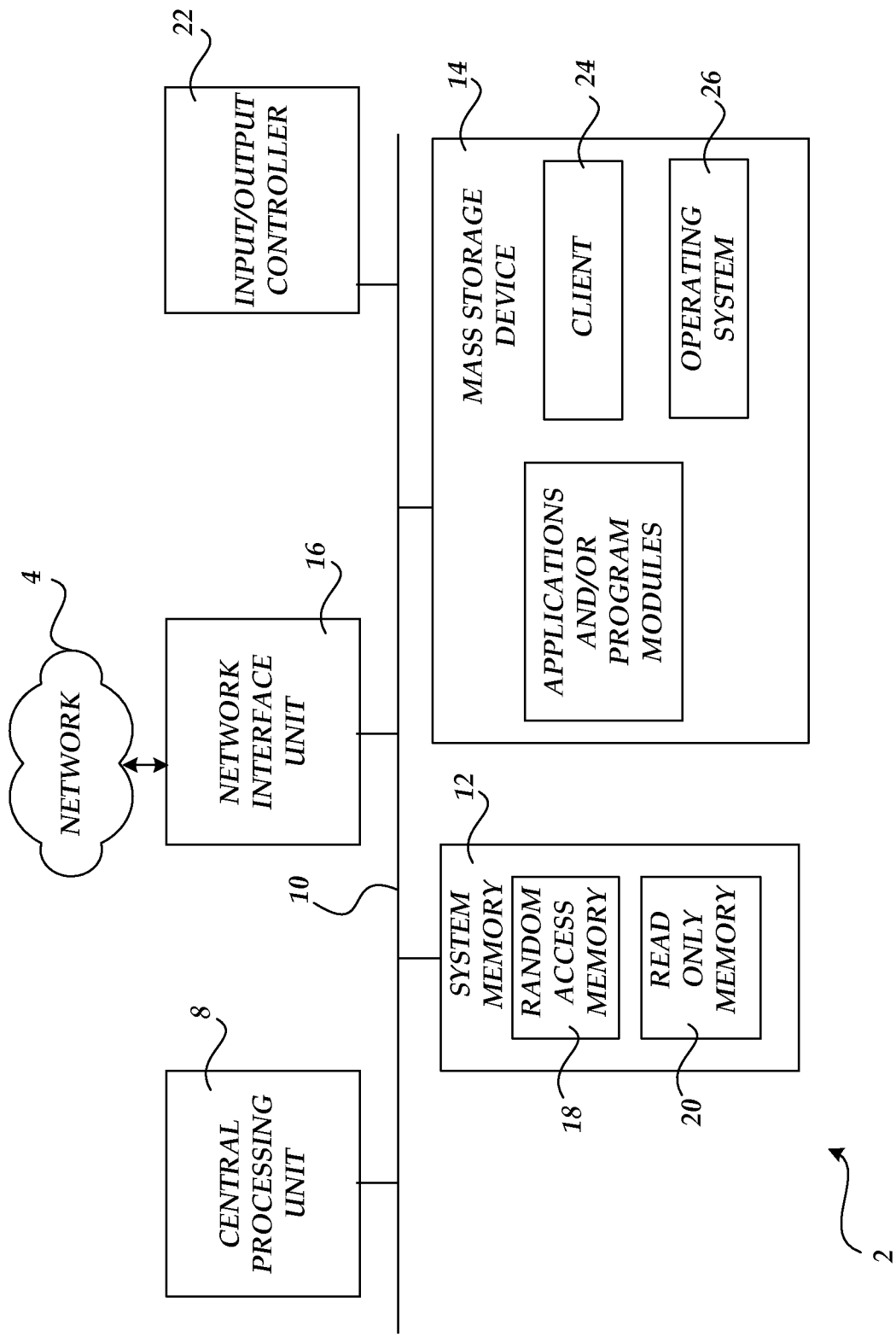
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs and other program modules. The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, etc. As shown in FIG. 7, a client 24 is included in the mass storage device 14 for use in various embodiments.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computing system to manage data comprising:
   at least one processor coupled to at least one memory;
   a client coupled to the at least one processor and configured to manage a composition of information by:
      identifying sets of data, wherein each set of data is associated with a distinct information source;
      identifying any shared portions based in part on corresponding data portions of the sets of data;
      determining one of a master and an override source of any identified shared portion that includes an informational change;
      using an application programming interface (API) to disassociate one or more data sources or portions thereof and remove or ignore one or more object bindings or mappings of any shared portions of the composition of information;
      using an override list to manage source override interactions for the sets of data including controlling source override operations for the sets of data as part of managing the composition of information, wherein a corresponding source of a shared portion cannot be overridden when the override list is empty or null;
      identifying any unmerged property instances associated with the composition of information;
      updating the composition of information based in part on one of a determined master and the override source including the informational change of any of the identified shared portions, the updating including merging any identified unmerged property instances based in part on aspects of a determined master for any identified shared portion and the override list; and,
      providing the composition of information to include shared and unshared data portions in part by identifying unshared data having no conflict and no change, identifying unshared data having no conflict and at least one change, identifying shared data having no conflict and no change, identifying shared data having no conflict and a single master change, and identifying shared data having a plurality of masters with at least one data change.

2. The system of claim 1, wherein the client is further configured to manage a data composition by identifying a shared data portion associated with one master portion that includes a data change corresponding to a changed value of a name-value pair, wherein a property definition can be defined to include a source override list as an additional attribute.

3. The system of claim 2, the client being further configured to manage the data composition by automatically propagating the data change of the one master portion to one or more isolated systems associated with the shared data portion.

4. The system of claim 1, wherein the client being further configured to manage a data composition by identifying shared data portions having a plurality of master portions including identifying one or more data changes corresponding to one or more changed values of one or more name-value pairs, wherein the client manages the data composition further by determining a value for a merged property instance based on first and second values of an unmerged property instance including:
computing the value for the merged property instance if one of the values of the unmerged property instance is null by using the second value if the first value is null or using the first value when the second value is null; and
using the first value or the second value of the unmerged property instance for the value merged property instance when the first value is equal to the second value.

5. The system of claim 4, the client further configured to manage the data composition by administering one or more of the data changes of one or more of the plurality of master portions to any identified shared data portions based in part on a master change rule set.

6. The system of claim 4, the client further configured to manage the data composition by propagating one or more of the data changes according to a selected master portion associated with any shared data portions, wherein the propagating overwrites any data changes associated with a non-master portion.

7. The system of claim 4, the client further configured to manage the data composition by disassociating one of the distinct information sources and to remove any shared portions of a disassociated information source from the data composition.

8. The system of claim 4, the client further configured to generate a communication to one or more of the systems upon identifying a data change made by more than one master portion.

9. The system of claim 8, the client further configured to generate the communication event to include information associated with a type of master making a data change.

10. The system of claim 1, the client further configured to use a tracking object to define a composition of data structure to store in the at least one memory.

11. The system of claim 10, the client further configured to use the tracking object to construct the composition of data structure and to define source portions and at least one shared portion.

12. The system of claim 1, wherein the client can access data from three different source systems including a collaboration system, a line-of-business (LOB) system, and a communication system.

13. The system of claim 1, wherein each information source comprises one of a system, an application, and a device.

14. The system of claim 1, the composition manager component further configured to use the API to manage aspects of the composition of information.

15. A computing-based method of using data comprising:
accessing the data from a plurality of independent data sources;
creating a data composition based in part on the accessed data and a data change, the data composition including unshared and shared data portions, wherein the shared data portions correspond to shared data used by two or more independent data sources, the creating of the data composition further comprising identifying unshared data having no conflict and no change, identifying unshared data having no conflict and at least one change, identifying shared data having no conflict and no change, identifying shared data having no conflict and a single master change, and identifying shared data having a plurality of masters with at least one data change;
identifying a master or an override source of each shared portion;
manipulating the data composition by resolving any real conflicts including updating data portions of one or more of the plurality of independent data sources based in part on an identified master or an identified override source of each shared portion;
using an API to disassociate one or more data sources or portions thereof and remove or ignore one or more object bindings or mappings of any shared portions of the data composition;
using an override list to manage source override interactions including controlling source override operations as part of managing the data composition, wherein a corresponding source of a shared portion cannot be overridden when the override list is empty or null;
identifying any unmerged property instances associated with the data composition, wherein the updating of the data portions further includes merging any identified unmerged property instances based in part on aspects of an identified master of each shared portion and the override list; and,
storing the data composition as part of a compositional data structure in memory.

16. The method of claim 15, further comprising identifying a conflicting shared portion based in part on the data change and when two or masters are associated with the conflicting shared portion.

17. The method of claim 15, further comprising updating the data composition based in part on a propagation operation including updating name-value data pairs of each shared portion corresponding to a new data change.

18. A computer-readable storage device, including a client, wherein the client manages data by:
managing sets of name-value pairs, wherein each set of name-value pairs is associated with a distinct system;
managing mappings of name value-pairs between two or more of the distinct systems as part of managing a composition of information;
determining any corresponding name-value pairs of one or more of the sets based in part on the mappings of the name-value pairs;
identifying one of a master and an override source of any corresponding name-value pair;
identifying any data change and conflict associated with one or more of the corresponding name-value pairs;
using an override list to manage source override interactions for the sets of name-value pairs including controlling source override operations for the sets of name-value pairs as part of managing the composition of information, wherein a corresponding source of a shared portion cannot be overridden when the override list is empty or null;

using an API to disassociate one or more data sources or portions thereof and remove or ignore one or more object bindings or mappings of any shared portions of the composition of information;

identifying any unmerged property instances associated with the composition of information;

providing the composition of information to include shared and unshared portions in part by identifying unshared data having no conflict and no change, identifying unshared data having no conflict and at least one change, identifying shared data having no conflict and no change, identifying shared data having no conflict and a single master change, and identifying shared data having a plurality of masters with at least one data change; and, updating the composition of information including merging any identified unmerged property instances based in part on aspects of a determined master source for any shared portions and the override list.

19. The computer-readable storage device of claim 18, wherein the client can manage any conflict by disassociating one or more name-value pairs from one or more corresponding name-value pairs.

20. The computer-readable storage device of claim 18, wherein the client can administer any data change to a recipient system based in part on the master determination.

\* \* \* \* \*